April 16, 1929.   C. OMAN   1,709,803
ELECTRICAL MEASURING INSTRUMENT
Filed June 23, 1925
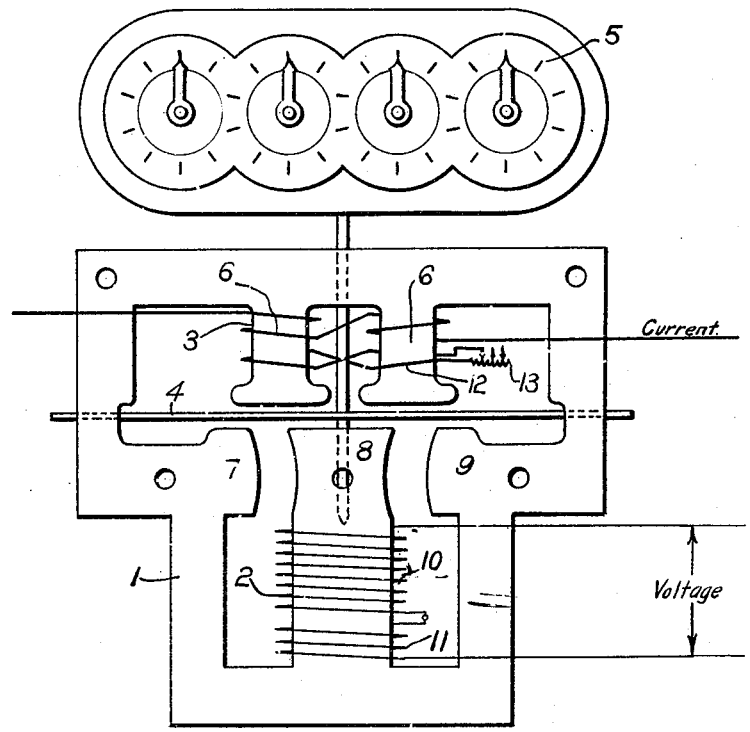
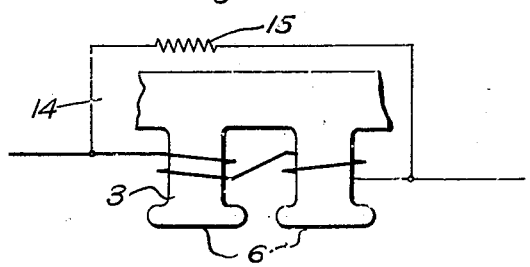
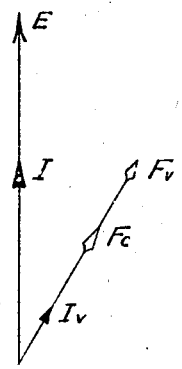
WITNESSES:
INVENTOR
Carl Oman.
BY
ATTORNEY Patented Apr. 16, 1929.

1,709,803

UNITED STATES PATENT OFFICE.

CARL OMAN, OF SWISSVALE, PENNSYLVANIA, ASSIGNOR TO WESTINGHOUSE ELECTRIC & MANUFACTURING COMPANY, A CORPORATION OF PENNSYLVANIA.

ELECTRICAL MEASURING INSTRUMENT.

Application filed June 23, 1925. Serial No. 38,960.

My invention relates to electrical measuring instruments and particularly to alternating-current instruments for measuring reactive volt-amperes.

One object of my invention is to provide a measuring instrument that measures the reactive component of energy in an alternating-current circuit with a negligible frequency error.

A further object of my invention is to provide a reactive volt-ampere-hour meter that is substantially of the same construction as a watthour meter except for the resistance and arrangement of the windings.

A further object of my invention is to provide an alternating-current meter having opposed pole pieces separated by an air gap, an armature member in said air gap, and current and voltage windings on said pole pieces for actuating the armature member, of such resistance that the magnetic fluxes traversing said armature member from the respective windings are in phase when the current and voltage applied to the instrument are in phase.

The ordinary watthour meter comprises a single core member or two co-operating core members on which are disposed current and voltage windings. On account of the high reactance of the magnetic circuits of said windings, the flux traversing the shunt portion of the core member is substantially 90° out of phase with the applied voltage and therefore maximum torque is exerted on the armature member when the current and voltage applied to the instrument are substantially in phase.

It has been proposed to modify this instrument when it is desired to measure the reactive component of energy by connecting reactive or condensive devices in the circuit thereof to displace the current and voltage applied to the instrument by 90° when the current and voltage of the circuit are in phase. The difficulty with this method is that the value of the reactance or capacitance in the circuit changes with changes of frequency, thereby introducing a large frequency error.

In accordance with my invention, the windings of the instrument are so modified as to obtain the desired displacement of the fluxes, thus overcoming the objection noted, as the frequency error is negligible.

In the accompanying drawings,

Figure 1 is a diagrammatic view of an alternating-current instrument embodying my invention;

Fig. 2 is a detailed view showing a modification of the series windings that may be employed; and Fig. 3 is a vector diagram showing the phase relation of the currents and the magnetic fluxes for the case of unity power factor.

Referring to Fig. 1, the reactive-component, single-phase meter shown comprises a magnetizable core member 1 having shunt and series windings 2 and 3 thereon, an armature member 4 actuated thereby in accordance with reactive volt-amperes and a register 5 to record the movement of said armature member. The core member 1 comprises two upper pole pieces 6 and three lower opposing pole pieces 7, 8 and 9. The upper and lower pole pieces are separated by an air gap in which the armature member 4 is disposed.

The series winding 3, energized in accordance with the current flowing in the associated circuit, is disposed on the upper pole pieces 6. The shunt winding 2, energized in accordance with the voltage of said circuit, is disposed on the lower central pole piece 8. As indicated in the drawing, relatively large air-gaps between the pole pieces 7 and 8 and 8 and 9 respectively, are provided in order that the reactance of the shunt winding 2 may be as low as possible.

The shunt winding 2 comprises two portions 10 and 11 connected in series. The portion 11 consists of a high-resistance conductor, such as copper-nickel alloy. Any other conductor having a suitable resistance may be employed. I have found that the winding 11 may comprise approximately 1500 turns of high-resistance conductor and the winding 10 about 3000 turns of copper conductor for 115-volt service. However, the winding may be composed entirely of a high-resistance conductor, if desired, inasmuch as the only requirements are a predetermined resistance and number of ampere-turns. On account of the high-resistance of the winding 2 and the air-gaps in the magnetic circuit thereof, the current traversing said winding will lag the applied voltage by a relatively small angle.

A short-circuited winding 12 is disposed on the series pole pieces 6 and is connected in series with a resistance 13. The short-circuited winding 12 is adapted to cause a resultant flux to traverse the series pole pieces 6, that will be out of phase with the current traversing the series winding 3. Such resultant flux component will lag in angular phase position the series current component by some small angle.

As shown in Fig. 3, when the voltage E and the current I in the circuit are in phase, the magnetic fluxes $F_c$ and $F_v$, generated by the current and voltage windings are in phase, since the current $I_v$ traversing the shunt winding lags a predetermined angle behind the applied voltage and the resistance 13 connected to the short-circuited winding 12 is of such value that the flux $F_c$ lags the same angle behind the current I traversing the series coil 3. Since the fluxes $F_c$ and $F_v$ traversing the armature member 4 are in phase at unity power factor, no torque is exerted on the armature member when the reactive component is zero. The torque on the armature member is a maximum at zero power factor since the fluxes $F_c$ and $F_v$ are 90° out of phase. For intermediate values of power factor, the torque depends upon the phase angle between the fluxes and, consequently, the armature member 4 is actuated in accordance with reactive volt-amperes and the register 5 integrates the reactive component of energy.

Since an instrument embodying my invention requires substantially no modification of the usual watthour meter structure except for the special windings, it may be constructed at a relatively low cost. Inasmuch as no reactive devices are used in the circuit of the instrument, the frequency error is negligible.

In Fig. 2 is shown a modification of the series windings that may be employed if desired. Instead of a short-circuited turn of a predetermined resistance upon the series pole pieces, a shunt circuit 14 containing a resistor 15 of predetermined value, is connected across the series winding 3. Since the vector sum of the currents traversing the shunt circuit 14 and the series winding 3 is equal to the line current, it is evident that the current through the one of said parallel portions having the greatest reactance, namely, the current through the series coil 3, lags the line current by an angle depending upon the resistance of the resistor 15. If the resistance of the resistor 15 is of the proper value, the flux traversing the series pole pieces 6 will be so displaced as to be in phase with the flux traversing the shunt pole pieces at unity power factor as represented by the diagram shown in Fig. 3.

I do not consider that my invention is limited to the precise embodiments shown and described herein as various modifications thereof will occur to those skilled in the art. For instance, the core member 1 may be composed of separate series and shunt elements instead of being a one-piece core member. Furthermore, the windings 2 and 12 may either or both be entirely composed of a high-resistance conductor, or an external resistor may be connected in series with the winding 2, the only essential requirement being that each winding have a predetermined number of turns and a predetermined resistance. Accordingly, I do not wish my invention to be limited in scope except as indicated in the appended claims.

I claim as my invention:

1. An alternating-current reactive-volt-ampere meter comprising series and shunt pole pieces, series and shunt windings thereon, at least part of said shunt winding being composed of copper-nickel alloy conductor, whereby the ratio of the ohmic resistance to inductance thereof is very high, a short-circuited winding on said series pole pieces and an armature member adapted to be actuated by said windings in accordance with reactive volt-amperes.

2. An alternating-current reactive-volt-ampere meter comprising a one-piece core member having upper and lower opposed pole pieces separated by an air gap, windings on both said pole pieces, one of said windings being composed of relatively high-resistance conductor as compared with the inductance of said winding, a short-circuited winding of predetermined resistance on one of said pole pieces and an armature member disposed in the air-gap between said opposed pole pieces.

3. An alternating-current meter comprising a movable element, a core member having shunt and series pole pieces, and means for actuating said element in accordance with reactive volt-amperes comprising windings for said shunt and series pole pieces, the winding for said shunt pole piece having a very high ratio of ohmic resistance to inductance and an auxiliary winding inductively related to said series winding for lagging the flux produced thereby.

4. An alternating-current meter comprising a movable element, a core member having shunt and series pole pieces, and means for actuating said element in accordance with reactive volt-amperes comprising windings for said shunt and series pole pieces, the winding for said shunt pole piece having a very high ratio of ohmic resistance to inductance and the winding for said series pole piece having means associated therewith for modifying the flux therefrom.

5. An alternating-current meter comprising a core member having a plurality of magnetic circuits, a current winding for energizing one of said circuits, means associated with said current winding for lagging the flux produced thereby a voltage winding having a high ratio of ohmic resistance to inductance for energizing another of said circuits, said last-mentioned circuit having an air-gap decreasing the reluctance of said core, a pivoted armature member for said core member and means including said windings for actuating said armature member in accordance with the reactive volt-amperes of the current and voltage applied to said current and voltage windings.

In testimony whereof, I have hereunto subscribed my name this 5th day of June, 1925.

CARL OMAN.